US012613885B2

(12) United States Patent
Last et al.

(10) Patent No.: US 12,613,885 B2
(45) Date of Patent: Apr. 28, 2026

(54) EXTENDING BLOCKCHAIN TO SUPPORT CONTROLLED BRANCHING AND CONSISTENT DATA RECONCILIATION FOR COLLABORATIVE DATA EVOLUTION

(71) Applicant: Raytheon BBN Technologies Corp., Cambridge, MA (US)

(72) Inventors: David Charles Last, Waltham, MA (US); Michael Hassan Atighetchi, Framingham, MA (US); Partha Pal, Boxborough, MA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 606 days.

(21) Appl. No.: 18/150,243

(22) Filed: Jan. 5, 2023

(65) Prior Publication Data

US 2025/0284707 A1    Sep. 11, 2025

Related U.S. Application Data

(60) Provisional application No. 63/296,650, filed on Jan. 5, 2022.

(51) Int. Cl.
| | |
|---|---|
| *G06F 15/16* | (2006.01) |
| *G06F 16/2455* | (2019.01) |
| *G06F 16/27* | (2019.01) |
| *G06F 21/60* | (2013.01) |
| *G06F 21/62* | (2013.01) |

(52) U.S. Cl.
CPC ...... *G06F 16/273* (2019.01); *G06F 16/24552* (2019.01); *G06F 21/602* (2013.01); *G06F 21/6227* (2013.01)

(58) Field of Classification Search
None
See application file for complete search history.

(56) References Cited

U.S. PATENT DOCUMENTS

| | | | |
|---|---|---|---|
| 9,507,798 | B1 * | 11/2016 | Zhao ................... G06F 16/1734 |
| 9,608,829 | B2 | 3/2017 | Spanos et al. |
| 10,929,545 | B2 | 2/2021 | Castinado et al. |
| 10,986,177 | B2 | 4/2021 | Basu |
| 11,042,873 | B2 | 6/2021 | Konik et al. |
| 11,153,092 | B2 | 10/2021 | Staples et al. |
| 2014/0025645 | A1 * | 1/2014 | Brown ................... G06F 16/25 |
| | | | 707/E17.005 |

(Continued)

OTHER PUBLICATIONS

"Chainmerger—unifying blockchains after a fork" (Sep. 24, 2017), [retrieved on Sep. 17, 2025]. Retrieved from the internet:,URL: https://ercwl.medium.com/chainmerger-unifying-blockchains-after-a-fork-4ccc930907c0.

(Continued)

*Primary Examiner* — Alex Gofman
(74) *Attorney, Agent, or Firm* — CANTOR COLBURN LLP

(57) ABSTRACT

Techniques for extending blockchain to support controlled branching and consistent data reconciliation for collaborative data evolution include: storing multiple data assets on a global ledger used by multiple nodes in a network; generating a first local cache for a first subset of the multiple nodes; storing, by a node in the first subset, a write transaction to the first local cache; and merging the write transaction from the first local cache onto the global ledger.

19 Claims, 16 Drawing Sheets

(56) References Cited

U.S. PATENT DOCUMENTS

| | | | | |
|---|---|---|---|---|
| 2016/0094390 | A1* | 3/2016 | Sirianni | G06F 16/1824 709/221 |
| 2018/0248845 | A1* | 8/2018 | Irwan | H04L 9/3239 |
| 2019/0253434 | A1* | 8/2019 | Biyani | H04L 9/3297 |
| 2020/0409952 | A1* | 12/2020 | Dean | G06F 16/9024 |
| 2022/0046072 | A1* | 2/2022 | Long | G06Q 20/223 |

OTHER PUBLICATIONS

"Life is a Cabaret . . . Or how to split and merge a blockchain" [retrieved on Sep. 17, 2025]. Retrieved from the internet: ,URL: https://steemit.com/eos/@iang/life-is-a-cabaret-or-how-to-split-and-merge-a-blockchain.

"The Fork-Merge and Bitcoin Private" (Mar. 21, 2018) [retrieved on Sep. 17, 2025]. Retrieved from the internet:, URL: https://griffinjknight. medium.com/the-fork-merge-and-bitcoin-private-bf64e404f47a.

"Citus Data," Citus Data. (accessed Jan. 6, 2021). [retrieved on Sep. 17, 2025]. Retrieved from the internet:, URL: https://www.citusdata. com/.

"Interplanetary File System (IPFS)," IPFS. [retrieved on Sep. 17, 2025]. Retrieved from the internet: URL: https://about.ipfs.io/.

"PostgreSQL: The World's Most Advanced Open Source Relational Database." (accessed Jan. 6, 2021). [retrieved on Sep. 17, 2025]. Retrieved from the internet:,URL: https://www.postgresql.org/.

"Proof of authority explained," binance.com, Dec. 9, 2020. [retrieved on Sep. 17, 2025] Retrieved from the internet:, URL: https://academy. binance.com/en/articles/proof-of-authority-explained.

"Proof of stake (POS)," ethereum.org, Dec. 9, 2021, [retrieved on Sep. 17, 2025]. Retrieved from the internet:, URL:https://ethereum. org/developers/docs/consensus-mechanisms/pos/.

A. Ledenev, "Pumba: chaos testing tool for Docker (Github)," Pumba: chaos testing tool for Docker (Github). [retrieved on Sep. 17, 2025]. Retrieved from the internet:, URL: https://github.com/ alexei-led/pumba.

Anceaume, et al. "Sycomore: a Permissionless Distributed Ledger that self-adapts to Transactions Demand" NCA 2018—17th IEEE International Symposium on Network Computing and Applications, IEEE, Nov. 2018, Boston, United States. pp. 1-8.

Brown, R. G. , "Corda: An Introduction," R3 CEV, vol. 1, 15 pages, Aug. 2016.

E Systems, "What is Link 16?," What is Link 16? [retrieved on Sep. 17, 2025]. Retrieved from the internet:, URL: https://www.baesystems. com/en-us/definition/what-is-link-16.

E. Androulaki et al., "Hyperledger Fabric: A Distributed Operating System for Permissioned Blockchains," EuroSys '18, Apr. 23-26, 2018, Porto, Portugal, 15 pages.

M. Kamaruzzaman, "Top 10 databases to use in 2021," towardsdatascience.com, Jan. 20, 2021. [retrieved on Sep. 17, 2025] Retrieved from the internet:, URL: https://medium.com/data-science/top-10-databases-to-use-in-2021-d7e6a85402ba.

Maesa, Damiano Di Francesco et al. "A blockchain based approach for the definition of auditable Access Control systems". Computers & Security 84 (2019), pp. 93-119.

Maesa, Damiano Di Francesco, et al. "Blockchain Based Access Control" IFIP International Federation for Information Processing, 2017, pp. 206-220.

Peters et al "A History of Bitcoin Hard Forks" [retrieved on Sep. 17, 2025]. Retrieved from the internet:,URL: https://www.investopedia. com/tech/history-bitcoin-hard-forks/.

Rouhani, Sara, et al. "Blockchain based access control systems: State of the art and challenges." IEEE/WIC/ACM International Conference on Web Intelligence. Oct. 14-17, 2019, pp. 423-428.

Ruan, P., et al., 2019. "Fine-Grained, Secure and Efficient Data Provenance on Blockchain Systems". Proceedings of the VLDB Endowment, vol. 12, No. 9, pp. 975-988.

S. Rouhani, et al. "MediChainTM: A Secure Decentralized Medical Data Asset Management System". 2018 IEEE Confs on Internet of Things, Green Computing and Communications, Cyber, Physical and Social Computing, Smart Data, Blockchain, Computer and Information Technology, Congress on Cybermatics, 1533-1538.

Spinellis, "Git," IEEE Software., vol. 29, No. 3, pp. 100-101, May/Jun. 2012.

* cited by examiner

| Principal | Operation | Target | Conditions |
|---|---|---|---|
| John Smith/ Cmdr/ Air Ops Center | Create/Update/ Delete | Target Assignments | Unrestricted |
| John Smith/ Cmdr/ Air Ops Center | Create/Update | Intel report | Within assigned Mission/Geographic Area |
| Jane Doe/ F-35 Pilot/ Aircraft F1 | Create/Delete | Target Assignments | Cmdr out of communication, Target and assigned Actor are within Principal's assigned Mission |
| Jane Doe/ F-35 Pilot/ Aircraft F1 | Create/Update | Intel report | Within assigned Mission, Geographic Area, Battle Execution Phase |

FIG. 11

EXTENDING BLOCKCHAIN TO SUPPORT CONTROLLED BRANCHING AND CONSISTENT DATA RECONCILIATION FOR COLLABORATIVE DATA EVOLUTION

RELATED APPLICATIONS

This application claims priority to U.S. Provisional Application 63/296,650, titled EXTENDING BLOCKCHAIN TO SUPPORT CONTROLLED BRANCHING AND CONSISTENT DATA RECONCILIATION FOR COLLABORATIVE DATA EVOLUTION, filed on Jan. 5, 2022, which is incorporated herein by reference in its entirety for all purposes.

STATEMENT REGARDING FEDERALLY-SPONSORED RESEARCH OR DEVELOPMENT

This application was made with government support under Contract No. FA8750-20-C-1546 awarded by the United States Department of Defense (DOD). The U.S. Government has certain rights in this invention.

BACKGROUND

Various situations include the general problem of how to maintain a consistent set of data between multiple parties, as well as a consistent view of how the data evolves over time (for example, where one data item may depend on another, and multiple actors may read or write data items in parallel). The industry standard approach to this problem is to use a database to enforce a serialization order on the operations performed on the data.

Centralized database—In a centralized database, one party hosts the database, an all users must access this central location to read/write to the database. FIG. 2 illustrates an example of a centralized database. A centralized database enforces a serialization order on operations, but all nodes need to connect with the central database to perform operations.

Replicated database—In a replicated database, one party hosts a "master" copy of the database, and pushes data and updates to "replica" copies of the database. The "master" enforces the serialization order. FIG. 3 illustrates an example of a replicated database. A drawback of this design is that "write" operations are centralized at the "master" node, although "read" operations are distributed to the "replica" nodes. If communications between the database and users go down, users can read the most recent version of the data, but they cannot write to the database.

Git—Git was designed as a distributed database for software projects. It is like a replicated database, but users can write to their local copies. FIG. 4 illustrates an example of a Git database structure. When users want to merge their local "write" operations with the master version, any updates that do not conflict with the master are automatically merged into the master, but conflicting updates (which usually result where the main branch and local branch have both been updated since they split) must be reconciled manually. FIG. 5 illustrates an example of a Git branch merge history. Git records a full history of what changes were made, and by whom.

Blockchain—Blockchain was designed as a completely distributed, leaderless database; its most well-known application is for cryptographic currencies like Bitcoin. In a blockchain network, all participants maintain a copy of the database. When one party wants to write to the database, they create a Write Transaction and submit it to the network for addition to the database. Network nodes that act as "miners" bundle these Transactions into Blocks, verify the correctness of the Block (e.g. make sure that coins being spent in these Transactions have not already been spent), and then append the Block to the end of the chain of Blocks (hence, "blockchain"). The "miner" advertises the new Block to its neighbors, which verify the Block for correctness and then advertise it to their own neighbors. For a blockchain network where the last Block in the chain is A, it is possible for two miners in different parts of the network to append blocks B1 and B2 to A, and propagate their different versions of the blockchain to their neighbors until the versions collide. In this case, blockchain has a mechanism to decide which version to keep, and the other version is discarded. Transactions in the discarded Block are returned to the pool of Transactions to be bundled into Blocks; it is possible that these Transactions are now invalid if they conflict with the Transactions in the accepted Block. A node that is disconnected from the network for a time will download Blocks appended to the blockchain during its absence before it resumes participation in the blockchain network.

The uniqueness of Blockchain is that it is completely leaderless—it does not matter which nodes are out of communication. Also, because of cryptographic signatures on the Blocks, it is impossible for any party to tamper with the contents of the database (the Transactions) without this being immediately detected. However, blockchain is designed for situations where there is only one authoritative version of the database history (e.g. a bank ledger of currency transactions). It does not support multiple histories for the database (such as arise in Git or the blockchain fork resulting from different Blocks being added to the chain) or merging multiple histories into a single, reconciled history (like Git). Even with good connectivity, and certainly in the presence of disconnection, blockchains can fork. Different blockchain solutions/applications handle forking differently. Some allow forward progress in parallel branches such that eventually all but one is unrolled/reverted. This approach may suffice for currency-based transactions, but is inadequate for many transactions that have real world effects. For example, it is not possible to unroll/revert a military operation to "unbomb" a bombed site. Therefore, some distributed ledger approaches do not allow forking.

Some other approaches use consensus protocols that can agree on serialization order. However, as with databases, consensus protocols require network connectivity. In some scenarios, constant connectivity cannot be guaranteed and disconnected units are unable to make progress on their own without access to a central master.

TECHNICAL FIELD

The present disclosure relates generally to maintaining a consistent set of data between multiple parties.

SUMMARY

In general, in one aspect, one or more non-transitory computer-readable media store instructions that, when executed by one or more processors, cause the one or more processors to perform operations including: storing multiple data assets on a global ledger used by multiple nodes in a network; generating a first local cache for a first subset of the multiple nodes and a second local cache for a second subset of the multiple nodes; storing, by a node in the first subset, a write transaction to the first local cache; and merging the write transaction from the first local cache onto the global ledger. Storing the write transaction to the first local cache may be performed responsive to determining that the node is not in communication with a majority of the multiple nodes.

The operations may further include: applying one or more conditional authority rules to determine that the first node is permitted to perform the write transaction. The one or more conditional authority rules may be configured to grant write permission to a highest-ranked node that is in communication with a majority of the multiple nodes. Applying the one or more conditional authority rules may depend at least on a mission context of the write transaction. Applying a conditional authority rule in the one or more conditional authority rules may include performing one or more of: (a) determining whether a conditional authority (CA) principal is an origin of the write transaction; (b) determining whether a CA rule operation matches the write transaction; (c) determining whether a CA rule target is an asset in the write transaction; or (d) determining whether the write transaction satisfies one or more CA rule conditions. The write transaction may be permitted only if (a), (b), (c), and (d) all are true.

Merging the write transaction from the first local cache onto the global ledger may include storing a branch history associated with the write transaction onto the global ledger. Merging the write transaction from the first local cache onto the global ledger may include reconciling a conflict between the global ledger and the first local cache, based at least on multiple weighted contextual factors.

The write transaction may be to update an existing data asset in the multiple data assets, and storing the write transaction to the first local cache may be performed responsive to determining that a most recent transaction associated with the existing data asset is not on the global ledger.

The operations may further include: responsive to determining that the node is not in communication with a majority of the multiple nodes, copying asset dependencies from the global ledger to the first local cache.

The operations may further include: after merging the write transaction from the first local cache onto the global ledger, terminating an asset history associated with the write transaction on the first local cache.

In general, in one aspect, a system includes at least one device including a hardware processor. The system is configured to perform operations including: storing multiple data assets on a global ledger used by multiple nodes in a network; generating a first local cache for a first subset of the multiple nodes and a second local cache for a second subset of the multiple nodes; storing, by a node in the first subset, a write transaction to the first local cache; and merging the write transaction from the first local cache onto the global ledger. Storing the write transaction to the first local cache may be performed responsive to determining that the node is not in communication with a majority of the multiple nodes.

The operations may further include: applying one or more conditional authority rules to determine that the first node is permitted to perform the write transaction. The one or more conditional authority rules may be configured to grant write permission to a highest-ranked node that is in communication with a majority of the multiple nodes. Applying the one or more conditional authority rules may depend at least on a mission context of the write transaction. Applying a conditional authority rule in the one or more conditional authority rules may include performing one or more of: (a) determining whether a conditional authority (CA) principal is an origin of the write transaction; (b) determining whether a CA rule operation matches the write transaction; (c) determining whether a CA rule target is an asset in the write transaction; or (d) determining whether the write transaction satisfies one or more CA rule conditions. The write transaction may be permitted only if (a), (b), (c), and (d) all are true.

Merging the write transaction from the first local cache onto the global ledger may include storing a branch history associated with the write transaction onto the global ledger. Merging the write transaction from the first local cache onto the global ledger may include reconciling a conflict between the global ledger and the first local cache, based at least on multiple weighted contextual factors.

The write transaction may be to update an existing data asset in the multiple data assets, and storing the write transaction to the first local cache may be performed responsive to determining that a most recent transaction associated with the existing data asset is not on the global ledger.

The operations may further include: responsive to determining that the node is not in communication with a majority of the multiple nodes, copying asset dependencies from the global ledger to the first local cache.

The operations may further include: after merging the write transaction from the first local cache onto the global ledger, terminating an asset history associated with the write transaction on the first local cache.

In general, in one aspect, a method includes: storing multiple data assets on a global ledger used by multiple nodes in a network; generating a first local cache for a first subset of the multiple nodes and a second local cache for a second subset of the multiple nodes; storing, by a node in the first subset, a write transaction to the first local cache; and merging the write transaction from the first local cache onto the global ledger. Storing the write transaction to the first local cache may be performed responsive to determining that the node is not in communication with a majority of the multiple nodes.

The method may further include: applying one or more conditional authority rules to determine that the first node is permitted to perform the write transaction. The one or more conditional authority rules may be configured to grant write permission to a highest-ranked node that is in communication with a majority of the multiple nodes. Applying the one or more conditional authority rules may depend at least on a mission context of the write transaction. Applying a conditional authority rule in the one or more conditional authority rules may include performing one or more of: (a) determining whether a conditional authority (CA) principal is an origin of the write transaction; (b) determining whether a CA rule operation matches the write transaction; (c) determining whether a CA rule target is an asset in the write transaction; or (d) determining whether the write transaction satisfies one or more CA rule conditions. The write transaction may be permitted only if (a), (b), (c), and (d) all are true.

Merging the write transaction from the first local cache onto the global ledger may include storing a branch history associated with the write transaction onto the global ledger. Merging the write transaction from the first local cache onto the global ledger may include reconciling a conflict between the global ledger and the first local cache, based at least on multiple weighted contextual factors.

The write transaction may be to update an existing data asset in the multiple data assets, and storing the write transaction to the first local cache may be performed responsive to determining that a most recent transaction associated with the existing data asset is not on the global ledger.

The method may further include: responsive to determining that the node is not in communication with a majority of the multiple nodes, copying asset dependencies from the global ledger to the first local cache.

The method may further include: after merging the write transaction from the first local cache onto the global ledger, terminating an asset history associated with the write transaction on the first local cache.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIG. 11 illustrates an example of Conditional Authority Rules according to an embodiment;

DETAILED DESCRIPTION

I. Introduction

One or more embodiments address technical problems related to maintaining a consistent set of data between multiple parties, as well as a consistent view of how the data evolves over time (for example, where one data item may depend on another, and multiple actors may read or write data items in parallel). Such problems may arise, for example, in Command and Control hierarchies.

Figure 1:
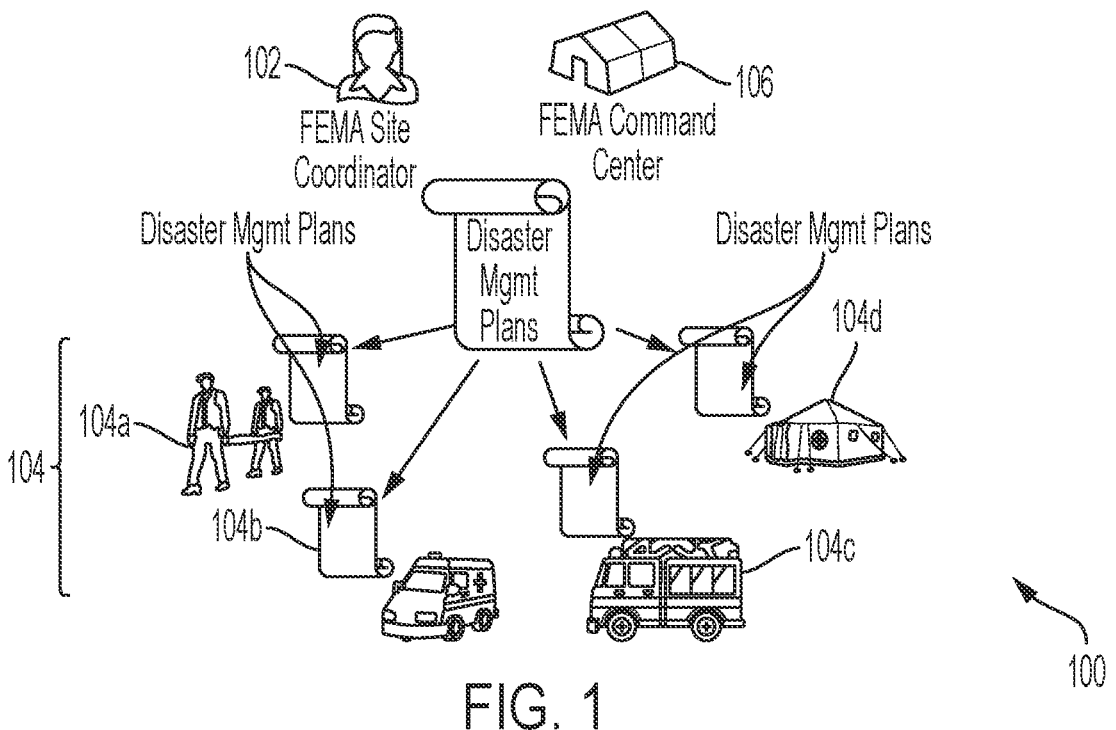
FIG. 1 illustrates an example of a post-disaster response.
Figure 2:
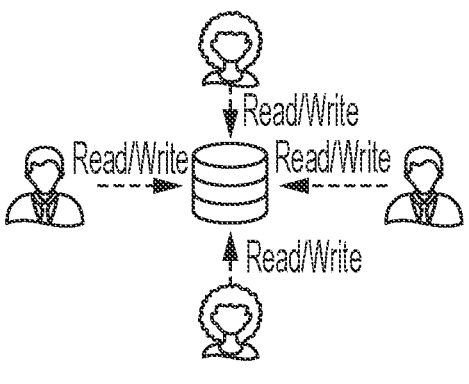
FIG. 2 illustrates an example of a centralized database.
Figure 3:
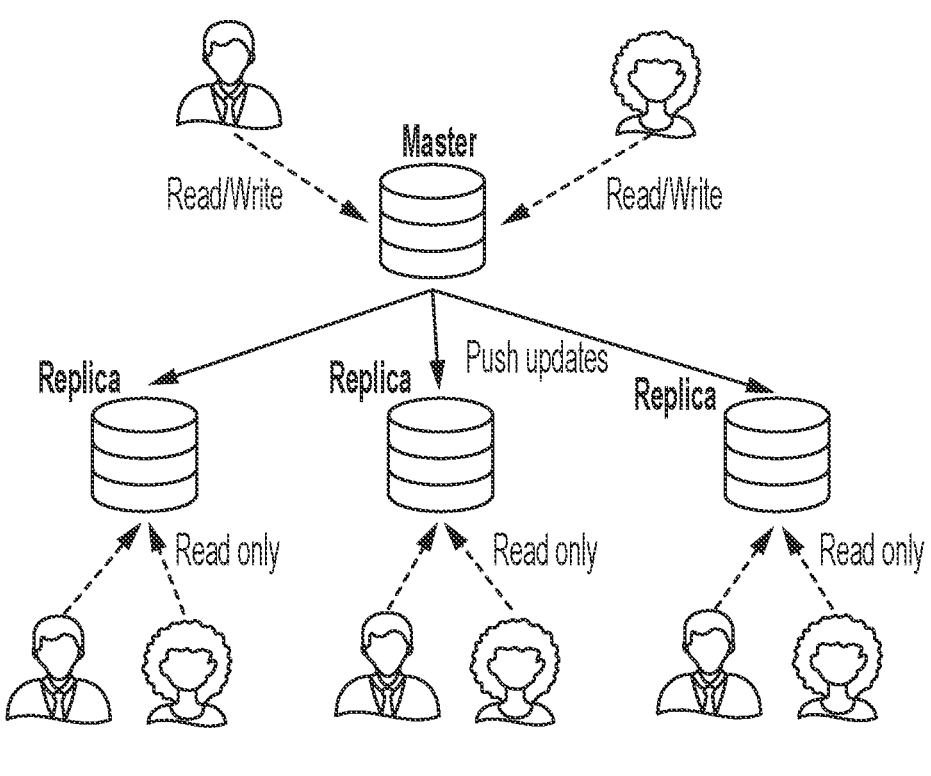
FIG. 3 illustrates an example of a replicated database.
Figure 4:
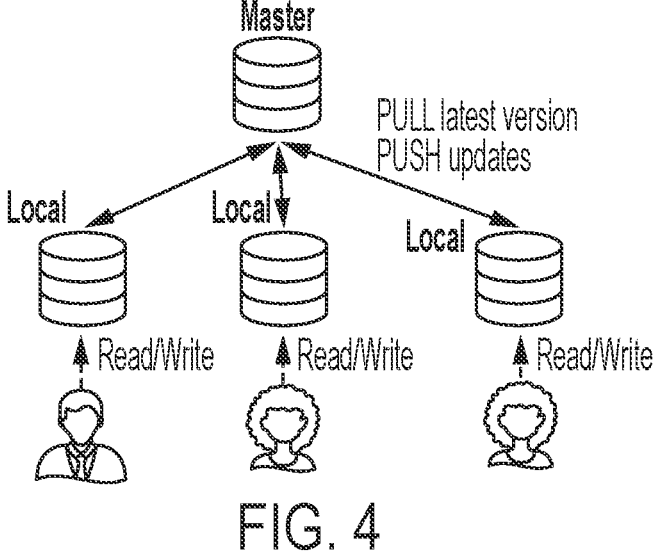
FIG. 4 illustrates an example of a Git database structure.

For example, FIG. 1 illustrates an example of a post-disaster response 100 being coordinated by the Federal Emergency Management Agency (FEMA). In such a scenario, the mission commander 102 (in this case, a FEMA Site Coordinator) and their planning staff 106 generate the plans for operations and disseminate those plans to the frontline units 104 who will be executing those plans (as shown in the example Command and Control hierarchy of FIG. 1, showing first, second, third, and fourth frontline units 104a, 104b, 104c, 104d). However, due to changing conditions in the field (e.g., discovering new civilians to be rescued, new gas leaks, etc.), these plans may need to be modified and updated. During normal operations, the on-the-ground intelligence would be passed back to the planning staff 106 of the mission commander 102. The planning staff 106 would generate updated plans and disseminate those plans back to the frontline units 104. However, in a situation where communications are intermittent/denied, this procedure may not be possible. In this case, it may be necessary to delegate certain authorities to the frontline units 104 to modify the plans in response to the on-the-ground conditions. Now, the version of the plans for one or more of the frontline units 104 have diverged from the version of the plans of the mission commander 102. The longer the two sides are out of communication, the more divergent these plans might become as both sides continue to update the plans.

Continuing the example, when the frontline units 104 come back into communication with the mission commander 102, there may be one or more critical needs, such as:

1) Automatically (i.e., with minimal human intervention) reconciling divergent versions of the plan into a single, consistent version where conflicts between the original versions are reconciled within the context of the mission. For example, fresh intelligence should replace stale intelligence, immutable data (e.g., Fire Engine 1 has extinguished the fire at Location X) should override mutable data (e.g., Fire Engine 3 has been assigned to extinguish the fire at Location X), etc.

2) For the reconciled versions of the plans/intelligence, recording the history/provenance of how the plans and other data evolved over time—for example, who made what decisions, what intelligence they had available at the time, what delegated authority allowed them to make those decisions, and/or why they made those decisions.

One or more embodiments of the present disclosure extend blockchain, allowing for (1) automatic merging of different versions of data with an understanding of the mission context (an advantage over Git manual merging) and (2) recording the entire branch history on a single blockchain (which is an extension of blockchain's current functionality).

A system according to an embodiment allows multiple parties to share data and/or collaborate on plans, especially in environments with intermittent communications. This type of product may be useful in situations including, for example: a group of autonomous vehicles and/or drones collaborating to complete a task; coordination between parties and/or units in austere environments, like wilderness search and rescue or Border Patrol; and/or logistics planning for trucking companies or parcel delivery companies like FedEx and/or UPS.

One or more embodiments extend existing blockchain functionality to allow the blockchain to branch in a controlled manner (existing practice) and then reconcile the branches with divergent data into a single consistent dataset. A blockchain is a sequence of database transactions that are linked together in a chain; this chain is maintained across multiple nodes in the network. If new transactions are added to the chain for some of the nodes but not others (perhaps because the two groups are out of communication), this results in a blockchain fork, where the two different versions of the blockchain are the two branches of the fork. Most blockchain systems in use today resolve a blockchain fork by selecting one branch as the authoritative branch and discarding the other branch, resulting in a single chain. One or more embodiments described herein permit forward progress in disconnected mode for permissible operations, with a facility to merge when connection is reestablished that preserves a consistent history of evolution of data through the fork and merge.

One or more embodiments described herein merge the two forks back into a single chain that is consistent between all nodes in the network. Prior approaches to merging a forked blockchain merely join the two forks back into a single chain; the transactions in the two branches are functionally different databases. One or more embodiments actually merge the data in the two branches so that the relevant data from both branches is preserved in a single, unified chain. One or more embodiments use Reconciliation Calculus that automatically decides how these versions of data are merged. Current tools like Git defer this merge decision to a human user for manual reconciliation. In addition, one or more embodiments merge the two blockchain forks into a single chain, while preserving the history of both blockchain forks within that single chain. This allows, for example, for audits or after-action reviews to logically trace the history of the data objects in the database through both of the forks. Thus, one or more embodiments allow groups of agents to collaboratively develop action plans (data), reconcile conflicts between different versions, and get a consistent version of the plans that all parties agree on.

II. System Architecture

Figure 6:
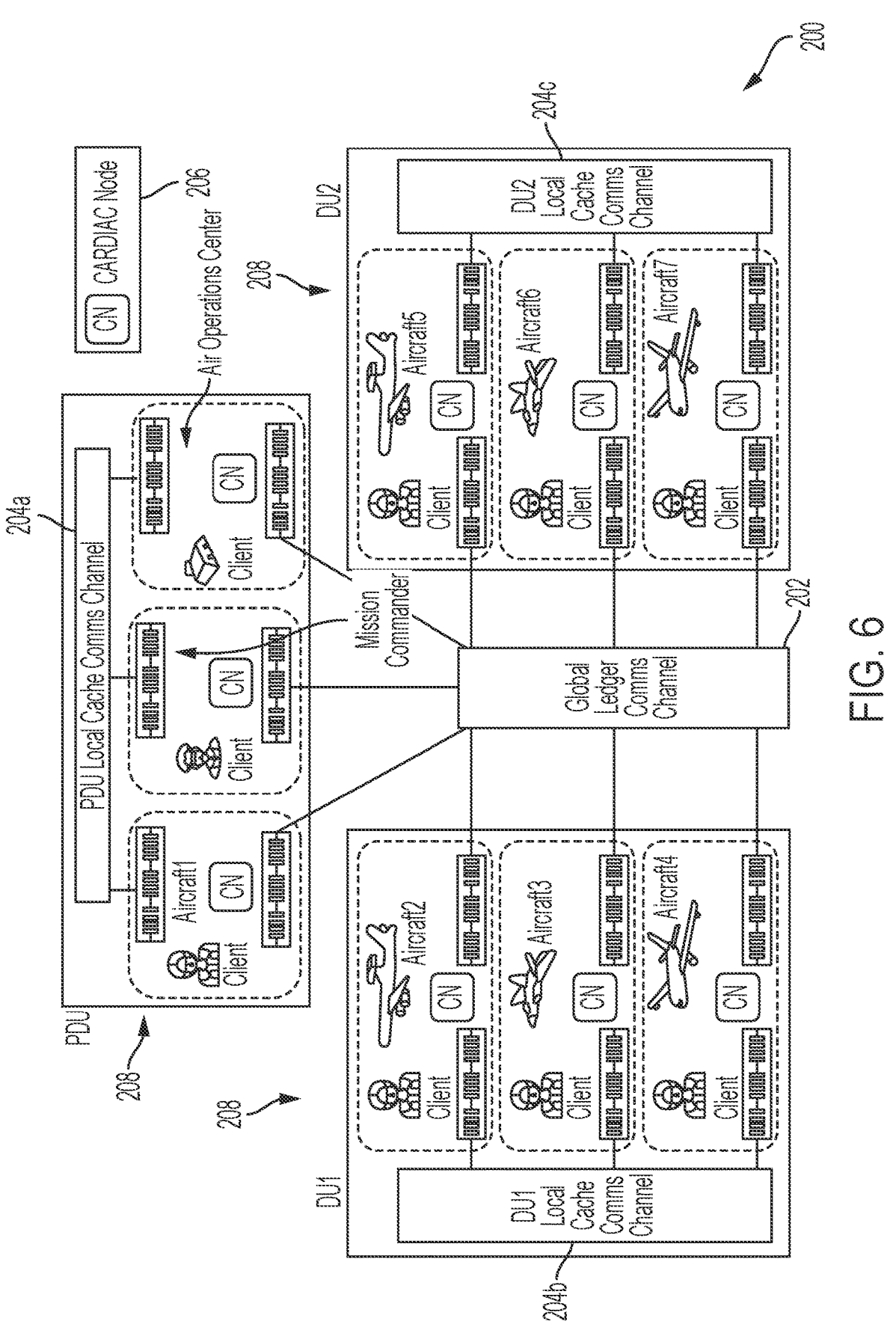
FIG. 6 illustrates an example of a system architecture according to an embodiment.

FIG. 6 illustrates an example of a system architecture 200 according to an embodiment. The architecture 200 is designed to support a common data store, called a Global Ledger, that is consistent between all network users, as well as one or more secondary data stores (Local Caches) to develop blockchain forks.

The architecture 200 includes a global ledger 202, one or more local caches 204a, 204b, 204c, a cardiac node 206, and a plurality of clients 208 ("client 208") associated with the various local caches 204a, 204b, 204c.

During operation, the architecture 200 in FIG. 6 records collaborative plans as a set of data Assets stored on the Global Ledger 202, which is a blockchain shared by all network participants. All Clients 208 can create, update, or delete Assets by means of database Transactions written to the Global Ledger 202. In order to explicitly prevent Gitstyle blockchain forks on the Global Ledger 202, the system may require a majority of network participants (Clients 208) to be in communication in order to write new Transactions to the blockchain. Since there can only be one majority partition at a time, this approach explicitly prevents blockchain forks. To address the situation where a Client 208 is not in communication with a majority of Global Ledger 202 nodes, the nodes may be divided into smaller groups (e.g., DU and PDU in the example of FIG. 6) that share a secondary blockchain (Local Cache 204a, 204b, 204c). If a Client 208 wants to write a Transaction to create/modify an Asset when it is not in communication with a majority of Global Ledger 202 nodes, this Transaction may be written to one of the Local Caches 204a, 204b, 204c to explicitly create/manage a blockchain fork. While out of communication with a majority of Global Ledger 202 nodes, a node may write new Transactions to one or more of the Local Caches 204a, 204b, 204c. A Merge Daemon may continuously check whether the node is part of a majority partition of the Global Ledger 202; if it is, the daemon may take steps to merge the Asset histories in the one or more Local Caches 204a, 204b, 204c onto the Global Ledger 202 (e.g., using a process discussed in further detail below).

One or more embodiments allow collaborative development of plans, but if the collaboration is unconstrained (e.g., if any Clients 208 in FIG. 6 can modify any of the plans), then there may be an explosion of blockchain branches, and the reconciliation/merging of blockchain branches may be very complex. In order to constrain this complexity, one or more embodiments limit which Clients 208 can update which Assets under which circumstances. One or more embodiments incorporate Conditional Authority rules to control database Write Transactions to the blockchain. The general design philosophy of the Conditional Authority rules is to let Write permissions reside with the highest-ranked Client of the clients 208. If that particular Client is out of communications, then the rules delegate authority to the highest-ranked Client of the clients 208 that is in communication. These rules may also constrain Write Transactions by geographic area and mission context to limit Write authority to the actor's area of responsibility.

In general, one or more embodiments use one or more of:

1) Conditional Authority rules that determine which parties are allowed to modify which plans under which conditions. One or more embodiments may make these determinations within the context of a mission, communication status, and a blockchain-based database.

Figure 5:
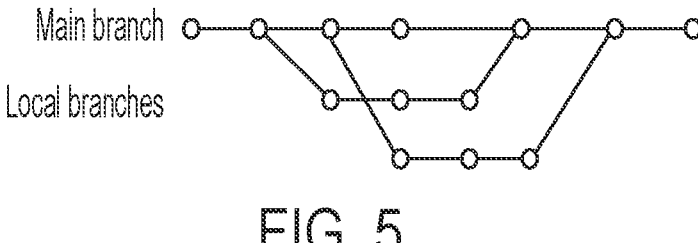
FIG. 5 illustrates an example of a Git branch merge history.

2) Authority- and context-aware merge calculus that (a) deconflicts conflicting blockchain forks and (b) stores multiple data histories onto a single blockchain (e.g., providing a merge history akin to that illustrated in FIG. 5).

III. Write, Merge, and Read Transactions

A. Write Transactions

Figure 7:
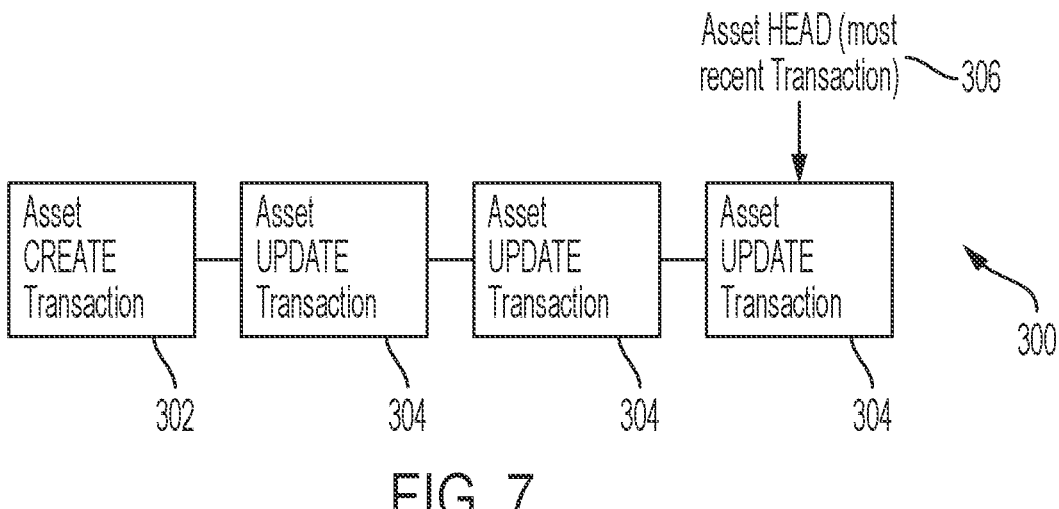
FIG. 7 illustrates an example of an asset evolution history according to an embodiment.

In an embodiment, clients create and evolve Assets on the blockchain using CREATE 302 and UPDATE 304 Transactions. FIG. 7 illustrates an example of an asset evolution history according to an embodiment. Note that Transactions illustrated in FIG. 7 may not be adjacent on the blockchain. The HEAD 306 of the Asset is the most recent Transaction in the Asset's history. When a Client submits a WRITE to the blockchain system, the system may initially determine whether this WRITE is permitted according to the Conditional Authority rules. A valid WRITE can result in UPDATE 304 transactions and/or CREATE 302 transactions to update and/or change the global ledger and/or other parts of the blockchain.

Figure 8:
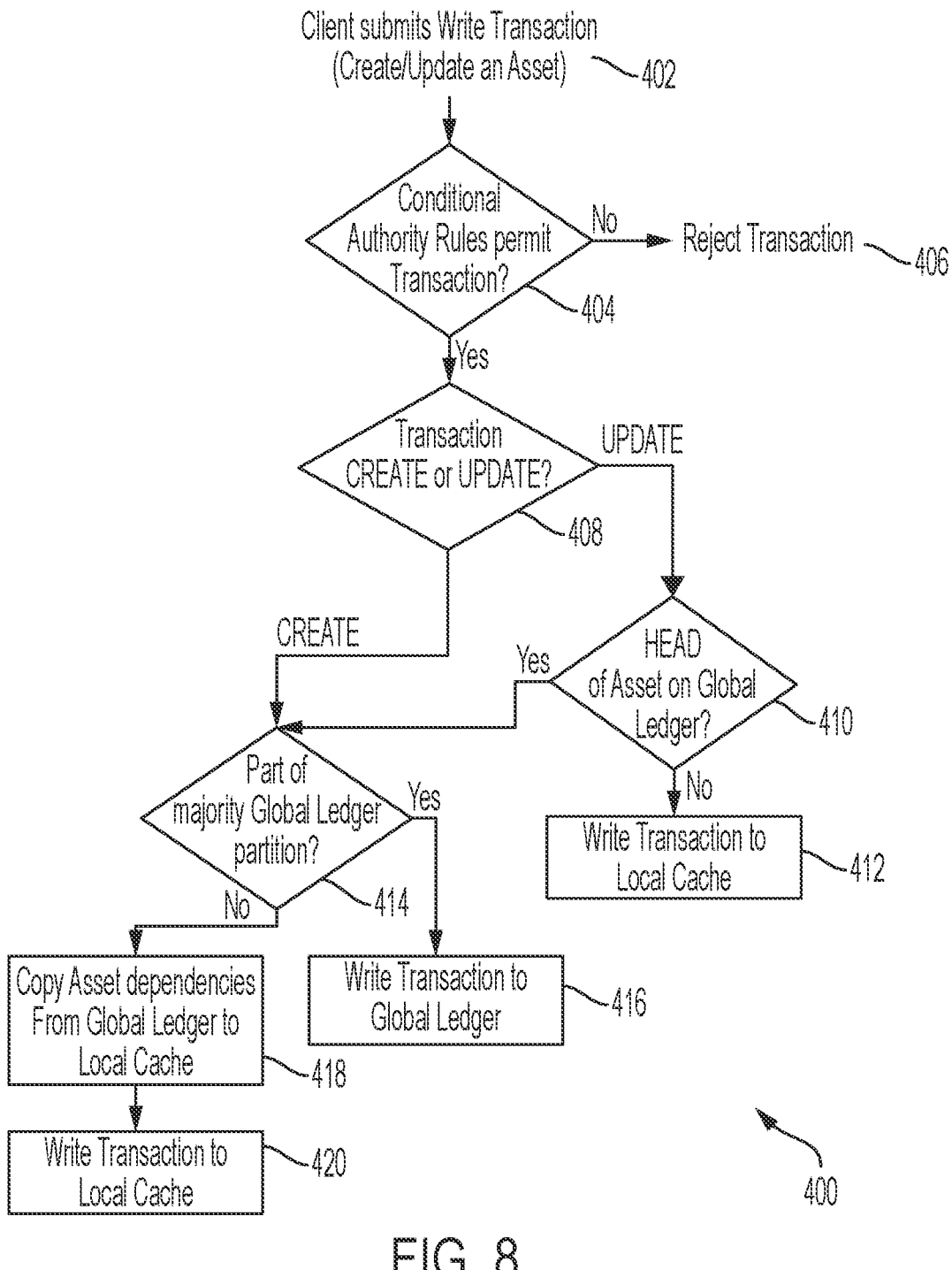
FIG. 8 illustrates an example of a database WRITE procedure according to an embodiment.
Figure 9:
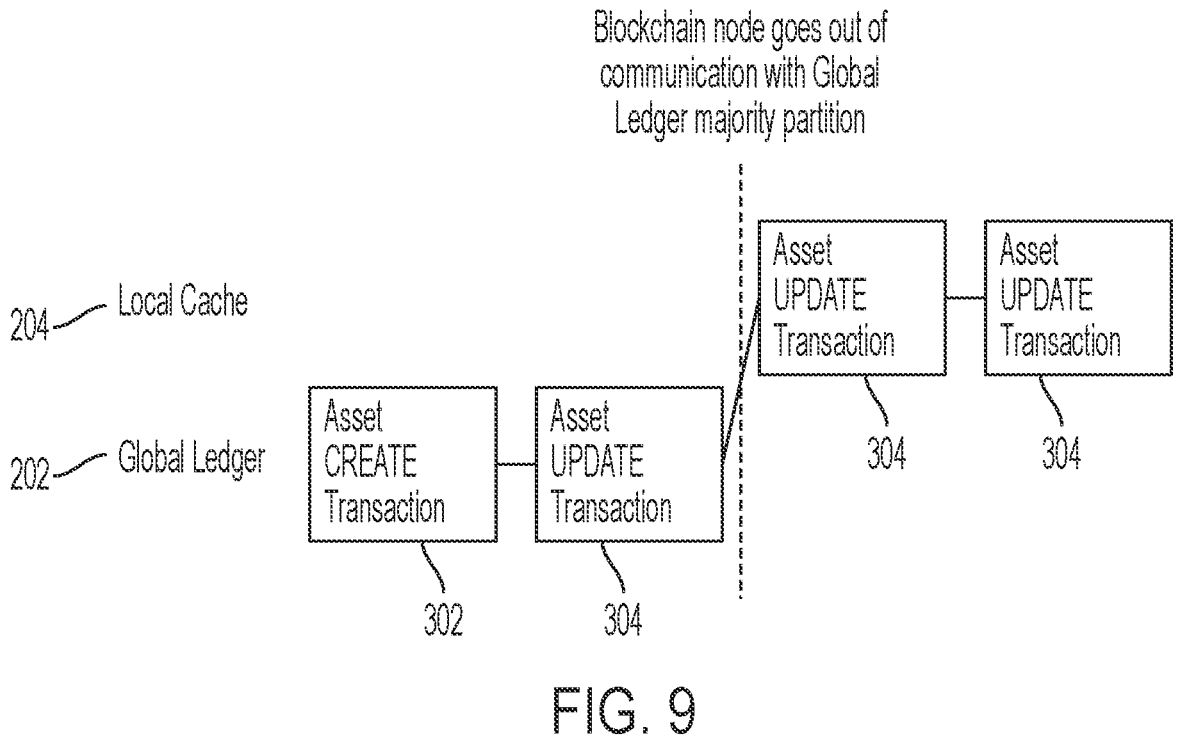
FIG. 9 illustrates an example of a result of repeated executions of the algorithm of FIG. 8 according to an embodiment.

FIG. 8 illustrates an example of a database WRITE procedure 400 according to an embodiment. If it is permitted, then the Transaction is written to the Global Ledger (as part of the main blockchain) or the Local Cache (as part of a branch off the main blockchain) according to the current communication status of the blockchain node to which the Transaction was submitted. FIG. 9 illustrates an example of a result of repeated executions of the algorithm of FIG. 8 according to an embodiment.

At act 402 a client submits a WRITE transaction to create and/or update an asset on the blockchain. The procedure 400 then proceeds to act 404.

At act 404, a controller compares the transaction to the conditional authority rules to determine if the transaction is permitted. The conditional authority rules may include any rules desired, such as rules requiring that the client have a certain permission level or that the request accord with a certain feature or purpose of the client's mission. If the controller determines the transaction is not permitted (404 NO), the procedure 400 continues to act 406. If the controller determines the transaction is permitted (404 YES), the procedure continues to act 408.

At act 406, the transaction is rejected. A rejected transaction is not permitted to be added to the block chain (either the main branch or the local caches). In some examples, a rejected transaction may still be recorded on the global ledger. For example, a user may wish to review rejected transactions to see when rejected transactions were created and/or what the rejected transactions included.

At act 408, the controller determines whether the transaction is a CREATE or UPDATE transaction. If the controller determines that the transaction is a CREATE transaction (408 CREATE) the procedure 400 continues to act 414. If the controller determines that the transaction is an UPDATE transaction (408 UPDATE), the procedure 400 continues to act 410.

At act 410, the controller determines whether the transaction is already the most recent transaction on the global ledger. If the controller determines that the transaction is not the most recent transaction on the global ledger (410 NO), the procedure 400 continues to act 412. If the controller determines that the transaction is the most recent on the global ledger (410 YES), the procedure 400 continues to act 414.

At act 412, the controller writes the transaction to a local cache. The transaction may remain on the local cache until it is reconciled with the global ledger at a later time. The transaction written onto the local cache will generally be a transaction that was not the head of the global ledger (e.g., the most recent transaction on the global ledger).

At act 414, the controller determines whether the controller is part of the majority in-communication partition of the Global Ledger 202 nodes. If the controller is part of the majority partition (414 YES), the procedure 400 continues to act 416. If the controller is not part of the majority partition (414 NO), the procedure 400 continues to act 418. The majority partition of the Global Ledger 202 nodes may contain the canonical partition of the global ledger, and thus may represent the partition of the global ledger that is merged and reconciled as will be described in greater detail with respect to FIGS. 13-19.

At act 416, the controller writes the transaction to the majority partition of the global ledger.

At act 418, the controller copies asset dependencies from the global ledger to the local cache so that the local cache can be updated to be consistent with the global ledger. In some examples, the local cache is updated to be identical to the majority partition of the global ledger and/or to the global ledger, until further inconsistent transactions are provided to the local caches and/or majority partition of the global ledger. The procedure 400 then continues to act 420.

At act 420, the transaction (with dependencies from the global ledger) is written to the local cache where it may be stored for later use.

B. Merge Daemon

In an embodiment, when a blockchain node goes out of communication with the Global Ledger 202 majority partition, Write Transactions 302, 304 become part of a fork of the Global Ledger that resides on the Local Cache 204. FIG. 9 illustrates an example of a Global Ledger 202 fork being maintained on the Local Cache 204 according to an embodiment. In the blockchain node, a software process called the Merge daemon continuously checks whether the blockchain node has rejoined the Global Ledger 202 majority partition. If it has, the Merge daemon chooses an Asset with history on the Local Cache 204, merges this history into the Global Ledger 202, and terminates the Asset's history on the Local Cache 204.

Figure 10:
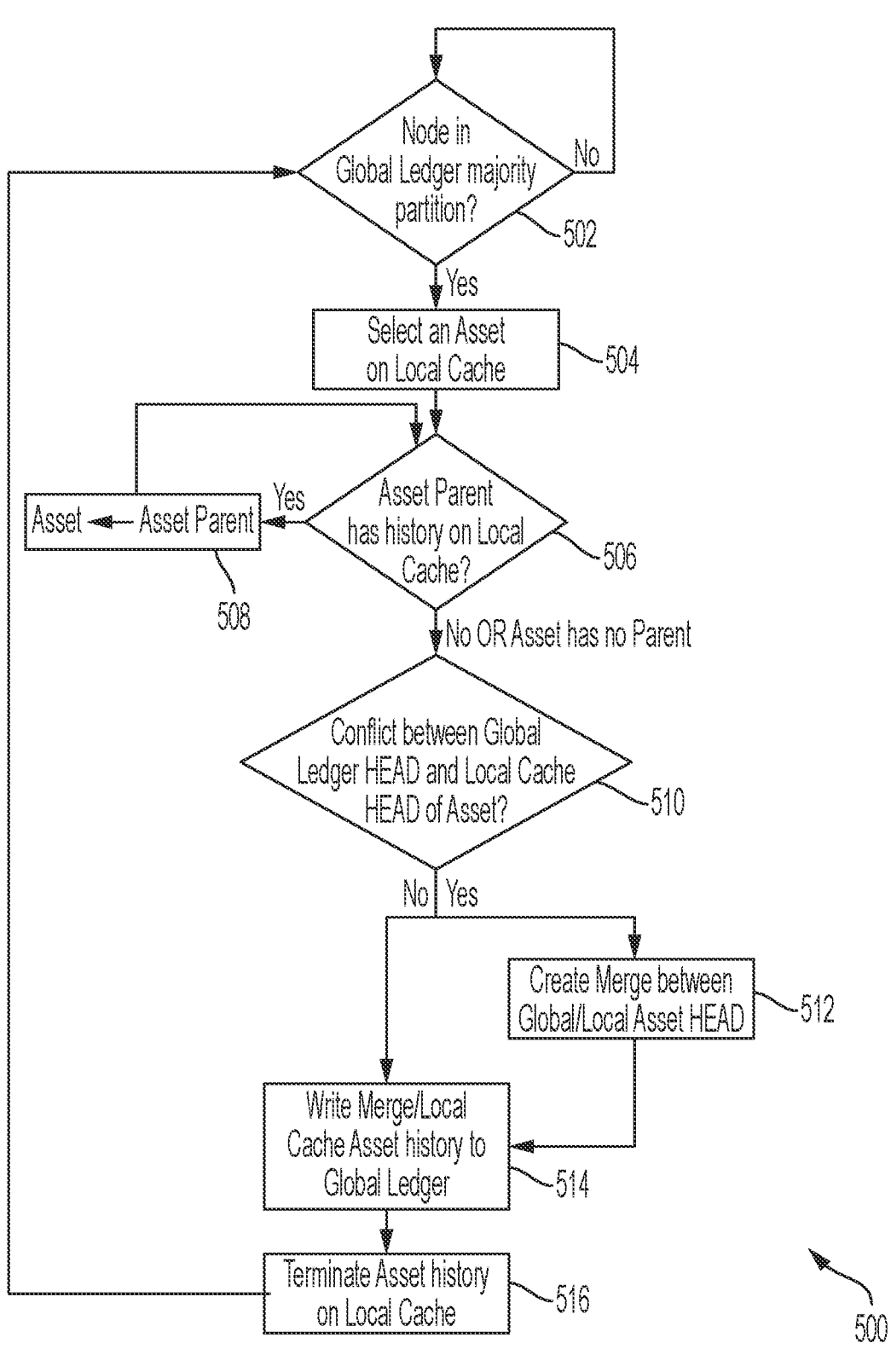
FIG. 10 illustrates an example of a merge daemon algorithm according to an embodiment.

FIG. 10 illustrates an example of a merge daemon algorithm 500 according to an embodiment.

At act 502, the controller determines if the blockchain node is in communication with the Global Ledger 202 majority partition. If the controller determines that the blockchain node is not in communication with the Global Ledger 202 majority partition (502 NO), the act 502 may repeat until the blockchain node is in communication with the Global Ledger 202 majority partition. If the controller determines that the blockchain node is in communication with the Global Ledger 202 majority partition (502 YES), the algorithm 500 proceeds to act 504.

At act 504, the controller selects an asset on the local cache (e.g., the local cache associated with the blockchain node). The algorithm 500 then proceeds to act 506.

At act 506, the controller checks to determine whether the parent asset of the asset has history on the local cache (i.e., previous write, update, or other types of transactions or modifications). If the parent asset has history on the local cache (506 YES), the algorithm 500 proceeds to act 508, where the controller substitutes the parent asset for the asset and then returns to act 506 to check with the parent of the parent asset has history on the local cache. In this recursive manner, the controller can check each parent asset in the lineage of the asset until the controller finds a parent asset without further history on the local cache. If the controller exhausts the asset parent history or the asset has no parent (506 NO), the algorithm 500 continues to act 510.

At act 510, the controller checks for a conflict between the global ledger head and the local cache head for the asset. If no conflict exists (e.g., the two heads are identical) (510 NO), the algorithm 500 continues to act 514. If a conflict exists (510 YES), the algorithm proceeds to act 512.

At act 512, the controller resolves the conflict between the two heads via a merge operation to combine and update the global and/or local asset head. The algorithm 500 then continues to act 514.

At act 514, the controller writes the merged asset history from act 512 (or the unconflicting asset history from act 510) to the global ledger. The algorithm 500 then continues to act 516.

At act 516, the asset history in the local cache is terminated by the controller as the asset history has been added to the global ledger. The algorithm 500 may then return to act 502 and repeat for additional assets at different points in time.

C. Read Operations

In an embodiment, when a Client issues a Read command for a particular Asset to a blockchain Client, it should return the HEAD of that Asset's history. This represents that Client's local view of the state of that Asset (which may be different from the Global Ledger's view). The Read operation should return the most recent HEAD of the Asset, whether it resides on the Global Ledger or the Local Cache.

IV. Conditional Authority Calculus

In an embodiment, as the first part of the Conditional Authority calculus, a Mission Context may be defined, in which the rules are evaluated. A number of entities may be defined in the blockchain mission space:

1. Actor—a definable combination of a human Client's identity, the role the Client inhabits (e.g., pilot, mission planner, fireman, etc.), and/or the platform the Client operates (e.g., F-35 jet, firetruck).
2. Sandbox—a combination of areas to which an Actor is assigned, such as the Unit (e.g., DU or PDU in the example of FIG. 6), Mission, Geographical Area, Time Bounds, etc.
3. Blockchain Operations—Create, Update, Delete.
4. Blockchain Data Assets—for example, Target, Target Assignment, Command and Control documents, Target Assignment Revocation, etc.
5. Conditions—for example, "Specific Client/Role is out of communication," "Actor is outside of its sandbox," etc.

Conditional Authority Rules may be defined with parameters Principal, Operation, Target, and Conditions. FIG. 11 illustrates an example of Conditional Authority Rules according to an embodiment. The Principal is an Actor (as defined above), the Operation is a Blockchain Operation, the Target is a Blockchain Data Asset, and the Conditions are defined as previously discussed.

When a Transaction is submitted to the blockchain network, one or more embodiments initially evaluate whether the Transaction is permitted or not according to the Conditional Authority rules stored on the blockchain. The Transaction may be evaluated against the Principal, Operation, Target, and Condition for each Conditional Authority rule. For example, Jane Doe may perform the Create/Delete operation with respect to target assignments when out of communication with the commander (John Smith) and when the target and assigned actor are within the scope of Jane Doe's assigned mission.

Figure 12:
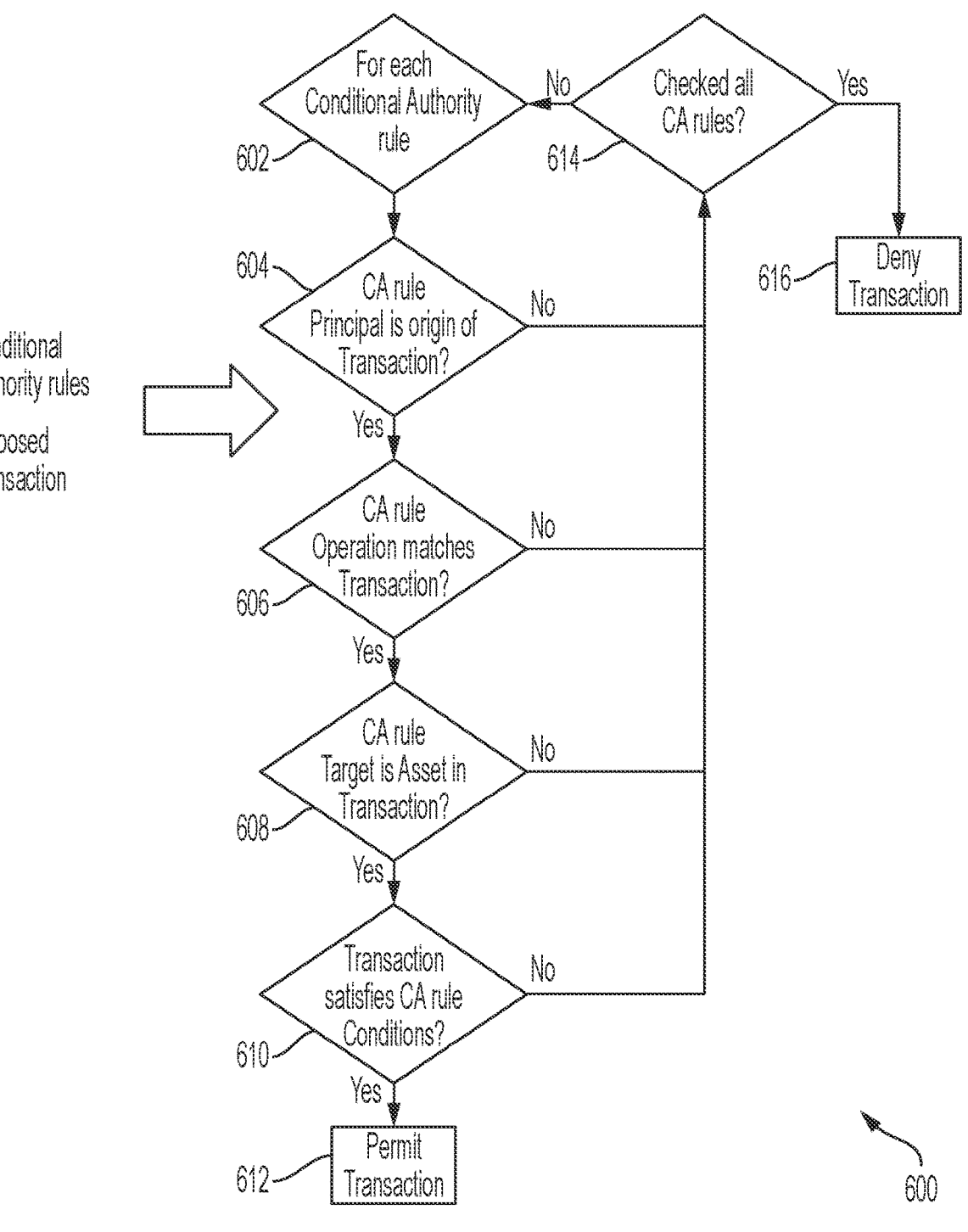
FIG. 12 illustrates an example of a Conditional Authority calculus algorithm according to an embodiment.

FIG. 12 illustrates an example of a Conditional Authority calculus algorithm 600 according to an embodiment.

At act 602, the controller evaluates a transaction submitted by a principal. In some examples, the transaction has an operation and/or a target associated with it. The controller begins to check a transaction against a conditional authority rule. As will be explained, the controller will evaluate the transaction in this respect until each authority rule is evaluated or the transaction is allowed. The algorithm 600 then continues to act 604.

At act 604, the controller evaluates whether the principal is the origin of the transaction. That is, the controller checks to see who or what the transaction originated from. In some examples, the controller may check to see if the principal is a valid principle before taking further action. If the controller determines that the principal is the origin of the transaction (604 YES), then the algorithm 600 continues to act 606. If the controller determines that the principal is not the origin of the transaction (or that the principal is not a valid principal) (604 NO), the algorithm 600 continues to act 614.

At act 606, the controller checks to make sure the operation matches the transaction. For example, the controller checks whether a "create/update" transaction has a create/update operation associated with it. If the controller determines the transaction and operation match (e.g., the create/update transaction has a create/update operation associated with it) (606 YES), the algorithm 600 continues to act 608. If the controller determines the transaction and operation do not match (e.g., a create/update transaction is associated with a create/delete operation) (606 NO), then the algorithm continues to act 614.

At act 608, the controller checks whether the target of the operation is an asset in the transaction and/or whether the target is a valid asset. If the controller determine that the target of the operation is an asset in the transaction (608 YES), the algorithm 600 continues to act 610. If the controller determines that the target of the operation is not an asset in the transaction (608 NO), the algorithm continues to act 614.

At act 610, the controller checks whether the transaction satisfies a conditional authority rule condition. For example, a conditional authority rule may require that the principal be within an assigned geography area when the transaction is created. If the controller determines that the principal does not satisfy the condition (e.g., the principal was not within an assigned geographic area when the transaction was created) (610 NO), the algorithm 600 may continue to act 614. If the controller determines the principal did satisfy the condition (e.g., the principal was within the assigned geographic area when the transaction was created) (610 YES), the algorithm continues to act 612.

At act 612, the transaction has passed all the rules and requirements it must pass, and the controller allows the transaction to occur. The controller may update the local caches or global ledger or another part of the blockchain.

At act 614, the controller determines whether every conditional authority rule has been checked. If not all of the rules have been checked (614 NO), the algorithm 600 may return to act 602 and repeat for the unchecked rule or rules. If every rule has been checked (614 YES), the algorithm 600 proceeds to act 616.

At act 616, the controller denies the transaction because the transaction has failed to pass any of the conditional authority rules, and the transaction is thus terminated.

Actors in the blockchain network may be authorized to create new Conditional Authority rules to delegate some of their authority to other Actors. In this case, the authority being delegated may be required to be a strict subset of one of the Conditional Authority rules pertaining to the delegating actor.

In an embodiment, the Mission Context transforms the rules from static Boolean expressions to dynamic assessments of the Actor submitting the Transaction, the Target of the Transaction, and the environmental conditions under which the Transaction was formed.

Figure 20:
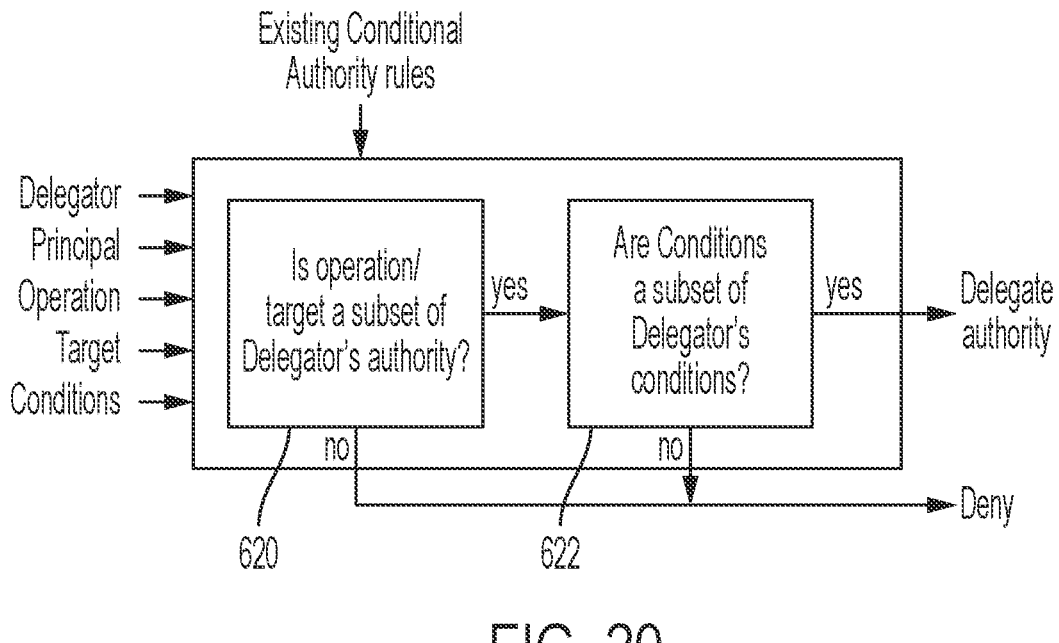
FIG. 20 illustrates an example of delegating authority according to one or more embodiments.

FIG. 20 illustrates an example of delegating authority according to one or more embodiments. In FIG. 20 the delegator attempts to delegate authority to a subordinate. At act 620, the controller checks whether the delegator has the power (i.e., authority) to perform the operation and/or the power to target a particular asset with the operation. If the controller determines that the operation and/or target are within the delegator's authority (620 YES), then the controller performs act 622. At act 622, the controller checks whether the conditions are a subset of the delegator's conditions. That is, if the delegator must be in an assigned geographic area to order or perform an operation, the delegate must also be in the assigned geographic area—otherwise, the delegator would be able to delegate authority to perform operations that the delegator could not, themselves, perform. If the controller determines that the conditions are a subset of the delegator's conditions (622 YES), authority is delegated to the delegate. If either conditions in acts 620 or 622 are not met, authority is not delegated and the controller denies the delegation.

V. Blockchain Fork Merging/Multiple Fork Histories Stored on a Single Chain

Figure 15:
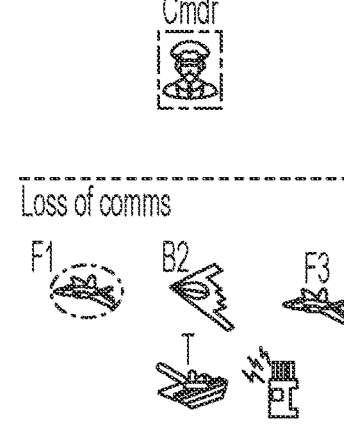
Figure 16:
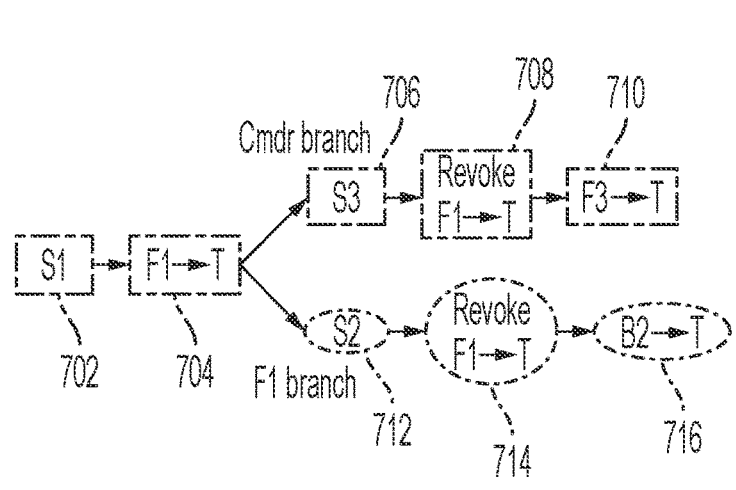
FIG. 16 illustrates an example of evolution of Data Assets over the course of a mission, according to an embodiment.
Figure 17:
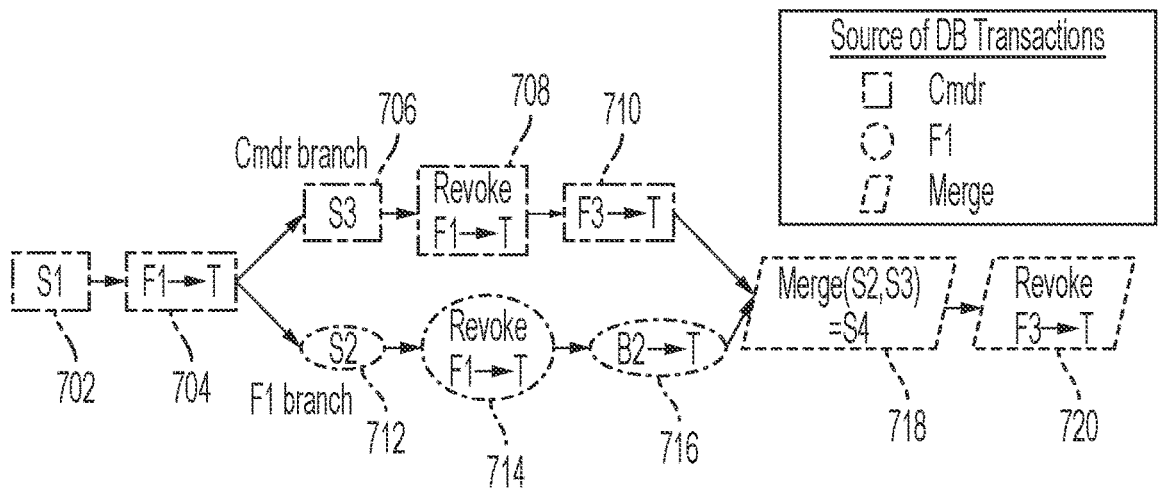
FIG. 17 illustrates an example of a logical Merge of blockchain branches according to an embodiment.
Figure 18:
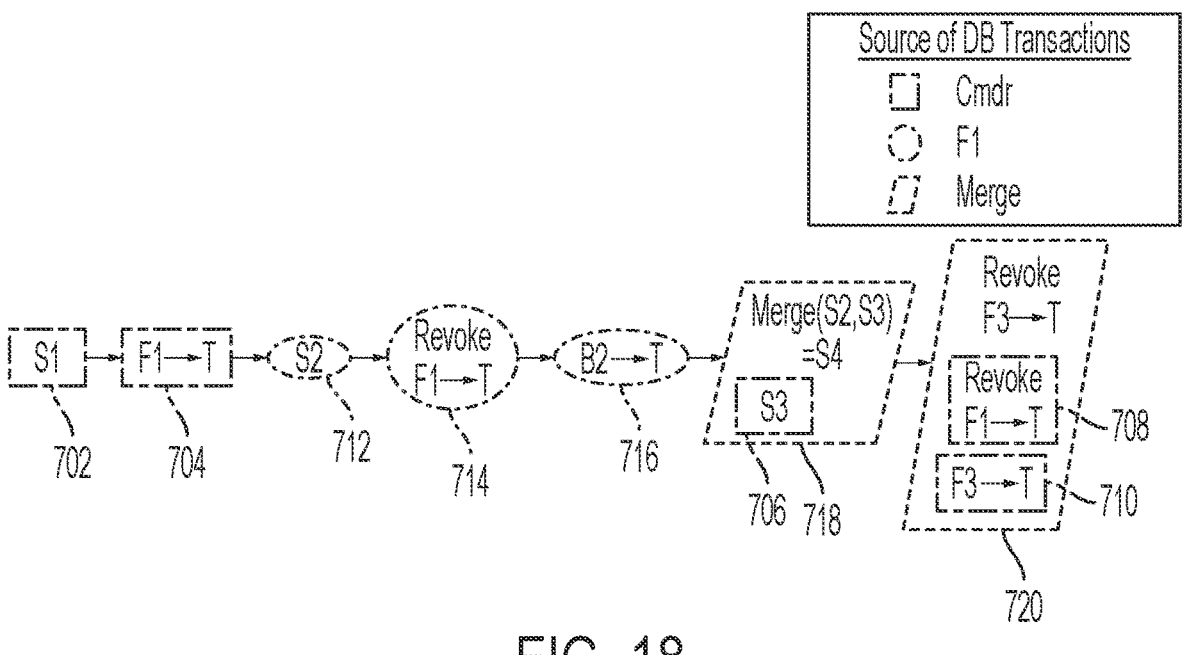
FIG. 18 illustrates an example of merged blockchain forks stored on a single Global Ledger blockchain according to an embodiment.
Figure 19:
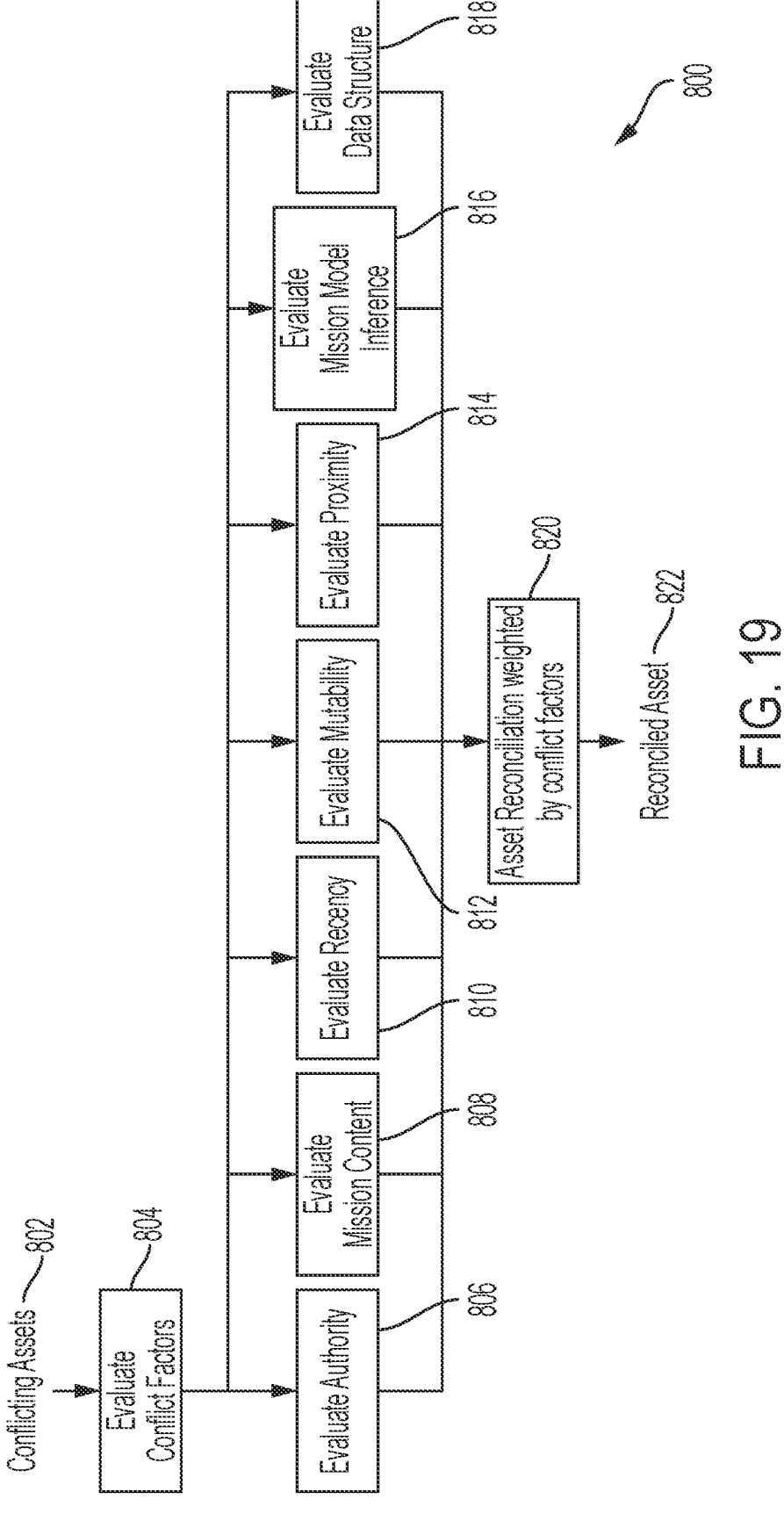
FIG. 19 illustrates an example of Merge calculus for an individual Asset, according to an embodiment.

The following example illustrates operation of blockchain fork merging/multiple fork histories stored on a single chain, according to an embodiment. For this example, FIGS. 13-15 illustrate movement of actors, FIG. 16 illustrates evolution of Data Assets over the course of the mission, FIG. 17 illustrates a logical Merge of blockchain branches, FIG. 18 illustrates merged blockchain forks stored on a single Global Ledger blockchain, and FIG. 19 illustrates Merge calculus for an individual Asset, according to one or more embodiments.

Figure 13:
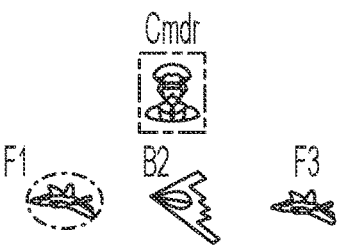
FIGS. 13-15 illustrate an example of movement of actors according to an embodiment.

In this example, the air component of a battlefield consists of one commander (Cmdr), two F-35 fighter jets (F1, F3), and one bomber (B2), as illustrated in FIG. 13. Cmdr receive intelligence regarding target T, which is an adversary tank with light armor. Cmdr creates an intelligence report S version one 702 (S1) containing this information on the Global Ledger. Cmdr also creates a Target Assignment 704 directing F1 to destroy T and stores it on the Global Ledger. All Transactions on the Global Ledger at this time are shared between Cmdr, F1, B2, and F3, as illustrated in FIG. 16.

Figure 14:
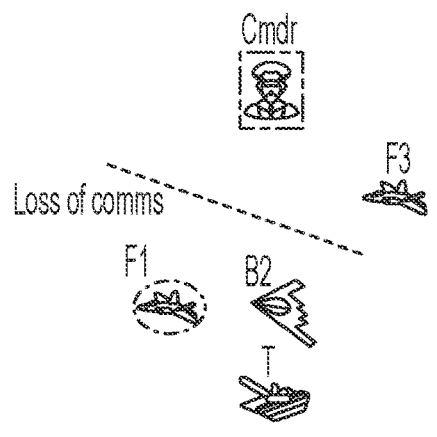

Continuing the example, F1 and B2 move towards T and lose communication with Cmdr, as illustrated in FIG. 14. F1 performs reconnaissance on T and observes that T has heavy armor, in conflict with the information in S1 702. F1/F3 do not carry munitions that can destroy heavy armor, but B2 does. Based on the Conditional Authority rules illustrated in FIG. 11, F1 updates S to version two 712 (S2) to include the updated armor information and writes it to the Global Ledger (shared between F1 and B2). Based on the Conditional Authority rules illustrated in FIG. 11, F1 revokes 714 its own Target Assignment 704 to T and creates a second target assignment 716 assigning B2 to target T. F1 writes these Transactions 712, 714, 716 to the Global Ledger, as illustrated in FIG. 16.

Meanwhile, Cmdr receives new intelligence that T possesses a communications jammer, which is relevant to units attacking T. Cmdr updates S to version three 706 (S3) and writes this to the Local Cache (shared between Cmdr and F3). T is a high priority target, and Cmdr is concerned that F1 may have been destroyed. Therefore, Cmdr revokes 708 the Target Assignment 704 of F1 to T and creates a third Target Assignment 710 for F3 and T. These are both written to the Local Cache (shared between Cmdr and F3), as illustrated in FIG. 16.

F3 moves towards T and loses communication with Cmdr but enters communication with F1 and B2, as illustrated in FIG. 15. As the Merge daemon seeks to reconcile F1/B2's Global Ledger with F3's Local Cache, it identifies two conflicts between the two versions of the plans:

1. S3 and S2 are out of sync. S3 contains stale/incorrect information on T's armor, and S2 does not contain intelligence about the jammer.
2. The Target Assignments 710, 716 between the two branches of the Global Ledger are out of synchronization.

These two conflicts are reconciled by the Merge daemon using the Merge calculus illustrated in FIG. 10. The Merge calculus illustrated in FIG. 19 evaluates multiple aspects of the conflict, including:

1. Authority: Cmdr has higher authority than F1.
2. Mission Context: F3 assignment is based on S3, while B2 assignment is based on S2.
3. Recency: critical information about T's armor in S2 is more recent than S3.
4. Mutability: T's heavy armor is immutable (cannot be changed), while F3 assignment to Tis mutable (can be revoked).
5. Proximity: the second target assignment 716 was made by F1 based on its self-collected intel S2. F3-T assignment was made by Cmdr based on second-hand intel S3.
6. Mission Model Inference: only one unit should be assigned to T.
7. Data structure: armor and jammer of T are independent data points.

The results of the evaluation of these different aspects are weighted and combined into a decision regarding the merge of the two blockchain branches. In this case, the following decisions are made:

1. S2 and S3 are merged into S4. Based on an understanding of the data structure, S4 contains the newest intel regarding the heavy armor and the jammer.
2. Based on an understanding of the mission context and the capabilities of F3 and B2's munitions, the third target assignment 710 is revoked, and the second target assignment 716 is maintained.

FIG. 17 illustrates a logical representation of this Merge according to an embodiment. The Cmdr creates S1 702 and the target assignment 704. When communication is lost between commander and F1 and B2, F1 creates S2 712, revokes 714 the target assignment 704, and then creates the second target assignment 716. Meanwhile, the Cmdr receives new intelligence of the communication jammer and creates S3 706. The Cmdr revokes 708 the target assignment 704 and creates the third target assignment 710. F2 leaves communication with Cmdr and enters communication with F1. The Cmdr's most recent orders (carried by F2) must be reconciled with the conditional authority of F1. The merge calculus evaluates the situation and creates a fourth version 718 (S4). The merge calculus determines that the mission is best served by revoking the third target assignment 710, leaving only the second target assignment 716 to be carried out.

However, the logical Merge of S2 712 and S3 706 must be stored in a single blockchain on the Global Ledger. One or more embodiments accomplish storing the logical merge on the global ledger by utilizing the blockchain structure shown in FIG. 18. The Transactions from F1 (i.e., version two 712) that were originally written to the Global Ledger remain as written, and the Merge Transactions exist as Updates to the Assets that they merge. However, the Merge Transactions for each Asset also contain the history from the Cmdr/F3 Local Cache branch. In this way, the branch history is stored on a single blockchain, but an operator performing a post-mission audit can logically reconstruct the branch history illustrated in FIG. 17. That is, the history of the third version 706 (including the revoke 708 of the target assignment and the third target assignment 710) remain stored in the blockchain and can be referenced at any time so that the precise sequence of activity on the blockchain can be reconstructed based on the single blockchain stored on the global ledger.

In an embodiment, the Merge calculus evaluates Asset conflicts against Mission Context, Recency, Mutability, Data Structure, and other factors and makes automated, intelligent Merge decisions based on a weighted analysis of these aspects (for example, as illustrated in FIG. 19). In addition, one or more embodiments store blockchain fork histories in a single blockchain (for example, as illustrated in FIG. 18). Prior blockchain approaches do not include either of these features.

FIG. 19 illustrates a process 800 for reconciling conflicting assets.

At act 802, conflicting assets are detected by the controller. The controller determines that the conflicting assets may need to be reconciled, and begins an evaluation of the conflicting assets.

At act 804, the controller begins an evaluation of the conflicting assets. The controller may, for example, identify what criteria are relevant to reconcile the assets, and may identify characteristics of the assets (for example, time-stamps, authority, and so forth) that may be relevant to reconciling the assets.

Acts 806 through 818 may be performed sequentially or in parallel. At act 806, the controller evaluates the authority of the assets. That is, the controller may determine that one asset has a higher authority level than another asset—for instance, a first asset could originate from a commanding officer, and a second asset could originate from a subordinate officer. The controller may store the authority data for the assets and provide the authority data to a weighted algorithm to reconcile the factors.

At act 808, the controller evaluates the mission context. The controller may infer, using machine learning or other techniques, the purpose of the mission or the current context of a mission operation, and evaluate which asset makes the most sense to use. For example, the controller determine that one asset is based on a first branch in the blockchain, and a second asset is based on a second branch in the blockchain, and may determine what differences between the block-chains informed the decision making process of creating the asset (for instance—the controller may recognize that one asset was based on a first set of data and the second asset was based on a possibly overlapping second set of data different from the first set of data). The controller may store the mission context data and provide the mission context data to a weighted algorithm to reconcile the factors.

At act 810 the controller evaluates the recency of an asset. For example, the controller may determine that one asset was created at a first time, and that another asset was created at a second time. The controller may determine the difference between the first and second times (that is, the amount of time between the first and second times), and provide this recency data to a weighted algorithm to reconcile the factors.

At act 812, the controller evaluates mutability. The controller may, for example, evaluate what factors are subject to change with regard to an asset, and what factors are not subject to change. The mutability data may be provided to a weighted algorithm to reconcile the factors.

At act 814, the controller evaluates proximity. For example, the controller may evaluate whether a branch in the blockchain was created based on first-hand observation or second-hand data. The controller may store the proximity data and provide it to a weighted algorithm to reconcile the factors.

At act 816, the controller evaluates mission model inference. For example, the controller may determine the most efficient use of resources (or a guiding principle for how to deploy resources). For example, if a target is high priority for destruction, the controller may determine that more resources should be directed to destroying it, whereas if a target is low priority for destruction, the controller may determine that fewer resources should be directed to destroying it. The mission model interference data may be provided to a weighted algorithm to reconcile the factors.

At act 818, the controller evaluates the data structure. For example, the controller may determine which data points related to the assets are independent of one another, and which are dependent. For example, armor and communications jamming are likely independent data points that exist without affecting each other, while the location of the target may be a dependent data point that can change based on external factors (i.e., is it raining so that the target is more likely indoors, or has the target become aware that they are targeted and thus taken evasive action, and so forth). The controller may provide the data structure to the weighted algorithm to reconcile the factors.

At act 820, the controller applies the weighted algorithm to the factors evaluated in earlier acts (e.g., acts 806 through 818). The controller determines, based on the algorithm, how to merge the assets to produce the reconciled asset. In some examples, the weighted algorithm is configured to provide a merger of the assets that best reflects or approximates the purpose of the mission. Once the controller has applied the weighted algorithm, the controller proceeds to act 822 and produces and/or propagates the reconciled asset to the blockchain.

VI. Multi-Field Applications

In an embodiment, as blockchain-based distributed database for collaborative planning has wide applications beyond the Air Force Command and Control use case discussed here. This system is applicable for any situation where multiple units need to collaboratively develop a plan and units need to be authorized to continue evolving the plan even when they are disconnected from the main group. As referenced earlier, this system can be used in a disaster response scenario. Especially in disaster zones, communications are likely to be intermittent, so frontline workers need to be able to collaborate on rescue plans with local units, and then reconcile their local plans with the central commander when opportunities arise. Similarly, this system could be used for Border Patrol/DEA drug interdiction in remote environments, Search and Rescue, or covert tracking applications for intelligence agencies or law enforcement. In addition, this system can support groups of autonomous and semi-autonomous vehicles such as airborne or ground-based drones that are collaborating to achieve a list of objectives. This has applications in logistics/parcel delivery, self-driving delivery trucks, and oil/mineral exploration. In general, one or more embodiments support many civilian and/or military use cases, including but not limited to: military theatre-level air/land/maritime Command and Control, etc.; and civilian disaster management, border control, surveillance operations, etc.

VII. General; Computer Systems; Networks

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 21:
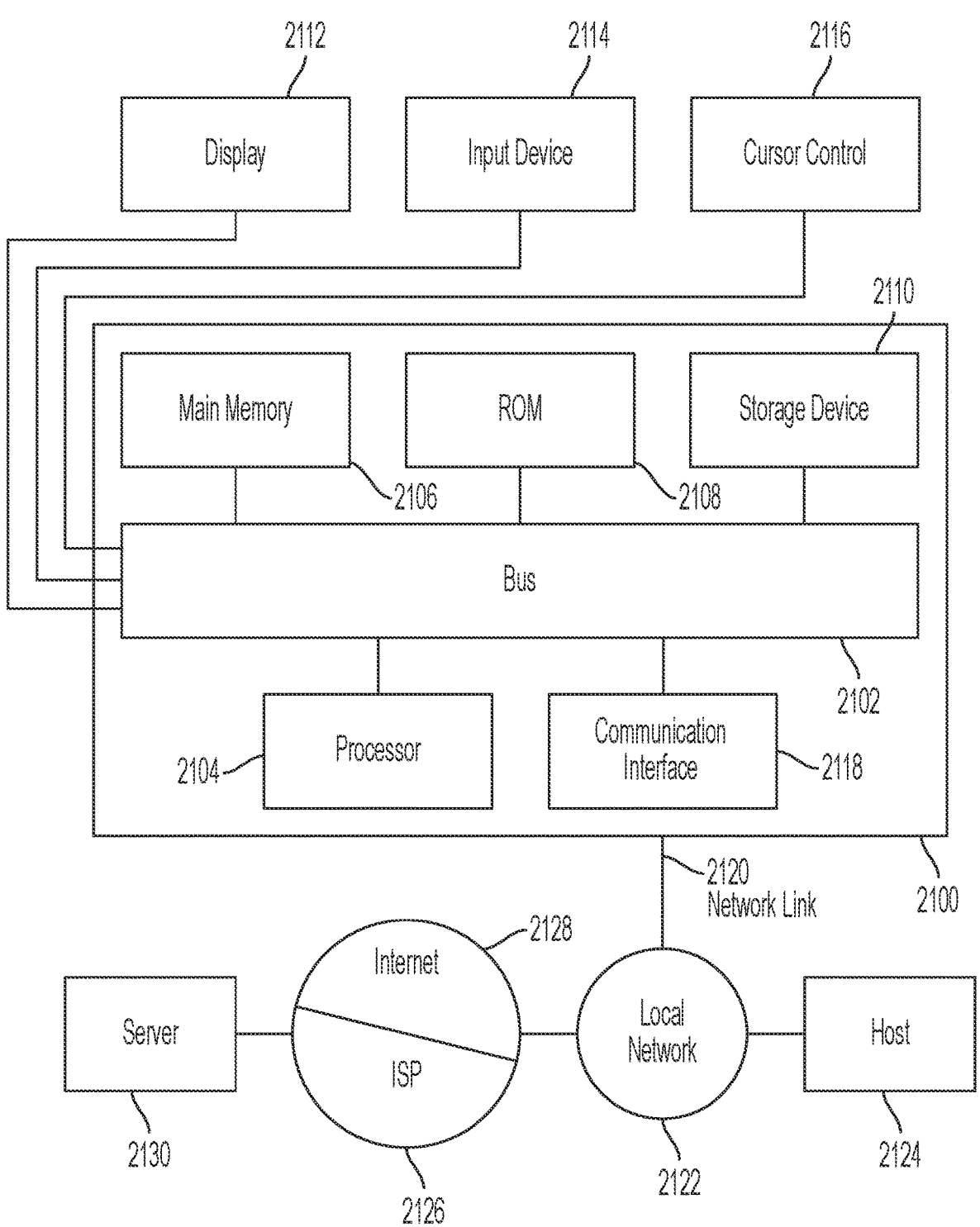
FIG. 21 is a block diagram of an example of a computer system according to an embodiment.

For example, FIG. 21 is a block diagram of an example of a computer system 2100 according to an embodiment. Computer system 2100 includes a bus 2102 or other communication mechanism for communicating information, and a hardware processor 2104 coupled with the bus 2102 for processing information. Hardware processor 2104 may be a general-purpose microprocessor.

Computer system 2100 also includes a main memory 2106, such as a random access memory (RAM) or other dynamic storage device, coupled to bus 2102 for storing information and instructions to be executed by processor 2104. Main memory 2106 also may be used for storing temporary variables or other intermediate information during execution of instructions to be executed by processor 2104. Such instructions, when stored in one or more non-transitory storage media accessible to processor 2104, render computer system 2100 into a special-purpose machine that is customized to perform the operations specified in the instructions.

Computer system 2100 further includes a read only memory (ROM) 2108 or other static storage device coupled to bus 2102 for storing static information and instructions for processor 2104. A storage device 2110, such as a magnetic disk or optical disk, is provided and coupled to bus 2102 for storing information and instructions.

Computer system 2100 may be coupled via bus 2102 to a display 2112, such as a liquid crystal display (LCD), plasma display, electronic ink display, cathode ray tube (CRT) monitor, or any other kind of device for displaying information to a computer user. An input device 2114, including alphanumeric and other keys, may be coupled to bus 2102 for communicating information and command selections to processor 2104. Alternatively or additionally, computer system 2100 may receive user input via a cursor control 2116, such as a mouse, a trackball, a trackpad, or cursor direction keys for communicating direction information and command selections to processor 2104 and for controlling cursor movement on display 2112. This input device typically has two degrees of freedom in two axes, a first axis (e.g., x) and a second axis (e.g., y), that allows the device to specify positions in a plane. Alternatively or additionally, computer system 2100 may include a touchscreen. Display 2112 may be configured to receive user input via one or more pressure-sensitive sensors, multi-touch sensors, and/or gesture sensors. Alternatively or additionally, computer system 2100 may receive user input via a microphone, video camera, and/or some other kind of user input device (not shown).

Computer system 2100 may implement the techniques described herein using customized hard-wired logic, one or more ASICs or FPGAs, firmware, and/or program logic which in combination with other components of computer system 2100 causes or programs computer system 2100 to be a special-purpose machine. According to one embodiment, the techniques herein are performed by computer system 2100 in response to processor 2104 executing one or more sequences of one or more instructions contained in main memory 2106. Such instructions may be read into main memory 2106 from another storage medium, such as storage device 2110. Execution of the sequences of instructions contained in main memory 2106 causes processor 2104 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 2110. Volatile media includes dynamic memory, such as main memory 2106. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 2102. Transmission media may also take the form of acoustic or light waves, such as those generated during radio-wave and infra-red data communications.

Various forms of media may be involved in carrying one or more sequences of one or more instructions to processor 2104 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 2100 may receive the data from the network and place the data on bus 2102. Bus 2102 carries the data to main memory 2106, from which processor 2104 retrieves and executes the instructions. The instructions received by main memory 2106 may optionally be stored on storage device 2110 either before or after execution by processor 2104.

Computer system 2100 also includes a communication interface 2118 coupled to bus 2102. Communication interface 2118 provides a two-way data communication coupling to a network link 2120 that is connected to a local network 2122. For example, communication interface 2118 may be an integrated services digital network (ISDN) card, cable modem, satellite modem, or a modem to provide a data communication connection to a corresponding type of telephone line. As another example, communication interface 2118 may be a local area network (LAN) card to provide a data communication connection to a compatible LAN. Wireless links may also be implemented. In any such implementation, communication interface 2118 sends and receives electrical, electromagnetic or optical signals that carry digital data streams representing various types of information.

Network link 2120 typically provides data communication through one or more networks to other data devices. For example, network link 2120 may provide a connection through local network 2122 to a host computer 2124 or to data equipment operated by an Internet Service Provider (ISP) 2126. ISP 2126 in turn provides data communication services through the world wide packet data communication network now commonly referred to as the "Internet" 2128. Local network 2122 and Internet 2128 both use electrical, electromagnetic or optical signals that carry digital data streams. The signals through the various networks and the signals on network link 2120 and through communication interface 2118, which carry the digital data to and from computer system 2100, are example forms of transmission media.

Computer system 2100 can send messages and receive data, including program code, through the network(s), network link 2120 and communication interface 2118. In the Internet example, a server 2130 might transmit a requested code for an application program through Internet 2128, ISP 2126, local network 2122, and communication interface 2118.

The received code may be executed by processor 2104 as it is received, and/or stored in storage device 2110, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory computer-readable media storing instructions that, when executed by one or more processors, cause the one or more processors to perform operations comprising:

storing a plurality of data assets on a global ledger used by a plurality of nodes in a network;

generating a plurality of local caches including a first local cache, each local cache of the plurality of local caches being associated with a respective subset of the plurality of nodes;

storing, by a node in a first subset of the plurality of nodes, the first subset being associated with the first local cache, a write transaction to the first local cache;

merging the write transaction from the first local cache onto the global ledger; and applying one or more conditional authority rules to determine that the first node is permitted to perform the write transaction;

wherein the one or more conditional authority rules are configured to grant write permission to a highest-ranked node that is in communication with a majority of the plurality of nodes.

2. The one or more non-transitory computer-readable media of claim 1, wherein storing the write transaction to the first local cache is performed responsive to determining that the node is not in communication with a majority of the plurality of nodes.

3. The one or more non-transitory computer-readable media of claim 1, wherein applying the one or more conditional authority rules depends at least on a mission context of the write transaction.

4. The one or more non-transitory computer-readable media of claim 1, wherein applying a conditional authority rule in the one or more conditional authority rules comprises performing one or more of:

(a) determining whether a conditional authority (CA) principal is an origin of the write transaction;

(b) determining whether a CA rule operation matches the write transaction;

(c) determining whether a CA rule target is an asset in the write transaction; or (d) determining whether the write transaction satisfies one or more CA rule conditions.

5. The one or more non-transitory computer-readable media of claim 1, wherein merging the write transaction from the first local cache onto the global ledger comprises storing a branch history associated with the write transaction onto the global ledger.

6. The one or more non-transitory computer-readable media of claim 1, wherein merging the write transaction from the first local cache onto the global ledger comprises reconciling a conflict between the global ledger and the first local cache, based at least on a plurality of weighted contextual factors.

7. The one or more non-transitory computer-readable media of claim 1, the operations further comprising:

after merging the write transaction from the first local cache onto the global ledger, terminating an asset history associated with the write transaction on the first local cache.

8. One or more non-transitory computer-readable media storing instructions that, when executed by one or more processors, cause the one or more processors to perform operations comprising:

storing a plurality of data assets on a global ledger used by a plurality of nodes in a network;

generating a plurality of local caches including a first local cache, each local cache of the plurality of local caches being associated with a respective subset of the plurality of nodes;

storing, by a node in a first subset of the plurality of nodes, the first subset being associated with the first local cache, a write transaction to the first local cache;

merging the write transaction from the first local cache onto the global ledger; and responsive to determining that the node is not in communication with a majority of the plurality of nodes, copying asset dependencies from the global ledger to the first local cache.

9. A system comprising:

a plurality of devices configured to write to a global ledger having a plurality of nodes, the plurality of devices including a first device, the first device having at least one processor, and the plurality of devices being configured to perform operations including storing a plurality of data assets on the global ledger, generating a plurality of local caches including a first local cache, each local cache of the plurality of local caches being associated with a respective subset of the plurality of nodes, storing, by a node in a subset of nodes associated with the first local cache, a write transaction to the first local cache, and merging the write transaction from the first local cache onto the global ledger; and applying one or more conditional authority rules to determine that the first device is permitted to perform the write transaction;

wherein the one or more conditional authority rules are configured to grant write permission to a highest-ranked device that is in communication with a majority of the plurality of devices.

10. The system of claim 9, wherein storing the write transaction to the first local cache is performed responsive to determining that the first device is not in communication with a majority of the plurality of devices.

11. The system of claim 9, wherein applying the one or more conditional authority rules depends at least on a mission context of the write transaction.

12. The system of claim 9, wherein applying a conditional authority rule in the one or more conditional authority rules comprises performing one or more of:

(a) determining whether a conditional authority (CA) principal is an origin of the write transaction;

(b) determining whether a CA rule operation matches the write transaction;

(c) determining whether a CA rule target is an asset in the write transaction; or (d) determining whether the write transaction satisfies one or more CA rule conditions.

13. The system of claim 9, wherein merging the write transaction from the first local cache onto the global ledger comprises storing a branch history associated with the write transaction onto the global ledger.

14. The system of claim 9, wherein merging the write transaction from the first local cache onto the global ledger comprises reconciling a conflict between the global ledger and the first local cache, based at least on a plurality of weighted contextual factors.

15. A method comprising:

storing a plurality of data assets on a global ledger used by a plurality of nodes in a network;

generating a plurality of local caches including a first local cache, each local cache of the plurality of local caches associated with a respective subset of the plurality of nodes;

storing, by a node in a first subset of the plurality of nodes, the first subset being associated with the first local cache, a write transaction to the first local cache; and merging the write transaction from the first local cache onto the global ledger; and responsive to determining that the node is not in communication with a majority of the plurality of nodes, copying asset dependencies from the global ledger to the first local cache.

16. The method of claim 15, wherein storing the write transaction to the first local cache is performed responsive to determining that the node is not in communication with a majority of the plurality of nodes.

17. The method of claim 15, the operations further comprising:

applying one or more conditional authority rules to determine that the first node is permitted to perform the write transaction.

18. The method of claim 17, wherein applying a conditional authority rule in the one or more conditional authority rules comprises performing one or more of:

(a) determining whether a conditional authority (CA) principal is an origin of the write transaction;

(b) determining whether a CA rule operation matches the write transaction;

(c) determining whether a CA rule target is an asset in the write transaction; or (d) determining whether the write transaction satisfies one or more CA rule conditions.

19. The method of claim 15, wherein merging the write transaction from the first local cache onto the global ledger comprises reconciling a conflict between the global ledger and the first local cache, based at least on a plurality of weighted contextual factors.

* * * * *